Jan. 9, 1940.  V. S. PENOTE  2,186,653
CLUTCH-OPERATING MECHANISM
Filed Feb. 23, 1938
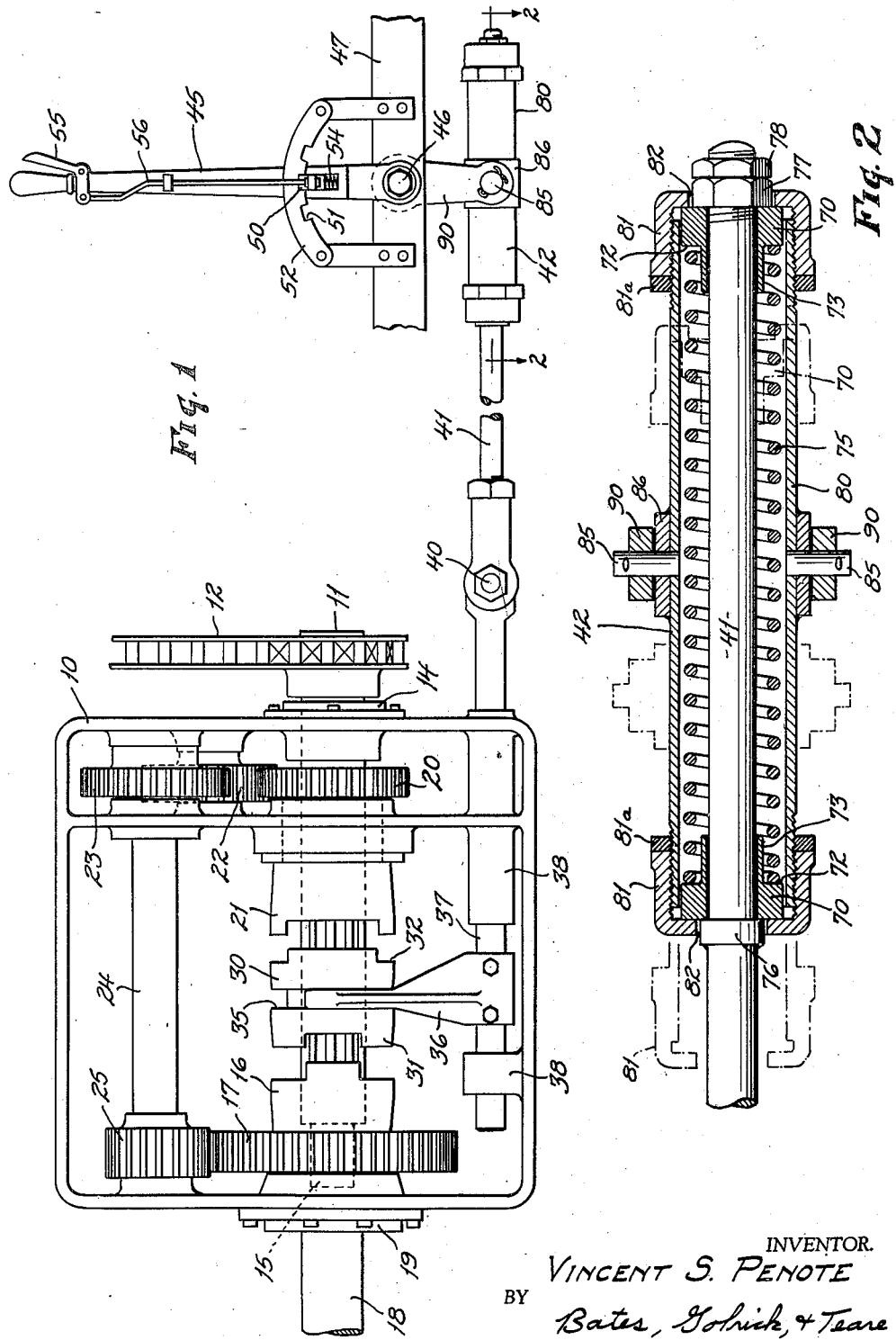
INVENTOR.
VINCENT S. PENOTE
BY
Bates, Gohrick, & Teare
ATTORNEYS Patented Jan. 9, 1940

2,186,653

UNITED STATES PATENT OFFICE 2,186,653

CLUTCH-OPERATING MECHANISM

Vincent S. Penote, Euclid, Ohio

Application February 23, 1938, Serial No. 192,091

1 Claim. (Cl. 74—470)

This invention relates to a clutch-operating mechanism, and especially to a clutch-operating mechanism for use in connection with heavy machinery having jaw-type clutches, and are operated by comparatively unskilled labor. In such machinery it is often desirable to provide a clutch with an operating lever which may be shifted and immediately released, leaving the operator's hands free for various other operations. It is also desirable to provide a clutch-shifting mechanism, so arranged as to prevent damage to the clutch part, due to the possible forcing of the manual operating levers when the clutch is not in position to be shifted. These, therefore, are the general objects of the present invention.

In the past, various types of complicated clutch-operating mechanisms have been used for many purposes. However, it has been found that such complicated mechanisms are not sufficiently rugged to withstand the rough usage to which they would be subjected if employed in comparatively heavy machinery, such as concrete mixers, dtiching machines, trenching machines and similar mechanisms operated by comparatively unskilled labor. Likewise, the cost of such mechanisms prohibits their installation on the type of machinery above mentioned.

Therefore, a further object of the present invention is to provide an efficient, rugged clutch-shifting mechanism, which may be economically manufactured and which may be subjected to abnormal usage, and yet which will protect the clutch mechanism and permit immediate moving of the clutch lever from one position to another, regardless of whether the clutch immediately engages or not.

Other objects of this invention will become more apparent from the following description, reference being had to a preferred embodiment of the invention, as illustrated in the accompanying drawing.

In the drawing, Fig. 1 is a side elevation of my improved clutch-operating mechanism, in actual use, and illustrates the connections between such mechanism and the clutch and the clutch-operating lever, respectively; Fig. 2 is an axial section of the operating mechanism, as indicated by the lines 2—2 on Fig. 1.

The operating mechanism with which this invention is especially concerned is adapted for use in comparatively rugged machinery, such as paving and ditching machinery, which machinery is operated at comparatively low speed, and yet which requires comparatively great power. In the drawing, I have more or less diagrammatically illustrated a change speed gear housing 10, having a driven shaft 11, to which power is transmitted from any suitable source, as by a power transmission chain 12. The shaft 11 is journalled at one end in a bearing 14 carried by the housing 10. At its other end 15, the shaft 11 is journalled in a hub 16 of a gear 17, to which the driving shaft 18 of the transmission is secured. The driving shaft is mounted in suitable bearings 19 carried by the housing.

Loosely mounted on the driven shaft 11 is a gear 20, which is provided with a clutch hub formation 21. The gear 20 constantly meshes with an idler pinion 22, which engages a gear 23 secured to a jack shaft 24. The shaft 24 is journalled in the housing 10 and has secured to it a pinion 25, constantly meshing with the gear 17, heretofore mentioned.

Splined to the driven shaft 11, intermediate the clutch formations 16 and 21, is a jaw clutch 30, one face 31 of which is arranged to selectively engage the clutch formation on the gear hub 16, and the other face 32 of which is arranged to selectively engage the clutch formation on the gear hub 21. It therefore follows that if the clutch 30 is moved to the right in Fig. 1, to engage the clutch formation 21, the shaft 11 will be drivingly connected, through the gears 22, 23 and 25, with the gear 17, and therefore with the driving shaft 18 of the transmission. This gearing as shown is so arranged as to provide a reverse drive. However, an over or under drive gearing may be substituted for the reverse gearing shown as desired. When, however, the clutch 30 is shifted to the extreme left-hand position, (Fig. 1) into engagement with the clutch formation 16, the driven shaft 11 will be directly connected with the clutch formation 16 and therefore with the driving shaft 18. Thus, providing a direct drive.

The clutch 30 is provided with an annular groove 35, which is engaged by a shifter fork 36, carried by a rod 37 slidably mounted in bosses 38, formed in the housing 10. The rod 37 is connected by a suitable joint 40, with a rod 41, of my improved operating mechanism 42, which in turn is pivotally connected with a manually operable lever 45. The lever 45 is pivoted as at 46 to a stationary frame member 47 of the machine, with which the mechanism is to be used. The lever 45 is provided with a latch 50 arranged to selectively engage any one of a series of notches 51 formed in a guide plate 52 attached to the frame. When the lever is moved to cause the latch to engage the extreme left-hand notch 51, the mechanism will be in position to cause the clutch 30 to engage the clutch hub 21, and thus establish the under or over drive, as the case may be. When the lever is moved from the neutral position in which it is shown in Fig. 1, to cause the latch to engage the extreme right-hand notch, the mechanism 42 will cause the clutch to couple the driven shaft directly with the driving shaft. The latch 50 is normally urged into one of the notches 51 by a spring 54 and is controlled by a handle 55, mounted on the lever and connected with the latch by a rod 56 in the usual manner.

My improved clutch-operating mechanism is best shown in Fig. 2. As there shown, it will be noted that I slidably mount a pair of sleeves 70 on the rod 41, heretofore described. Each of these sleeves is provided with a shoulder 72, and a reduced portion 73. A comparatively heavy compression spring 75 encircles the rod 41 and the reduced portions 73 of the sleeves and engages the shoulders 72 thereof. The left-hand sleeve 70 bears against a collar 76 rigidly secured to or integrally formed on the rod 41. This left-hand sleeve is placed on the shaft first, and the spring moved into place and the second sleeve positioned on the shaft, and secured in the adjusted position relative thereto by a nut 77, and a lock nut 78. Obviously, by loosening or tightening the nuts the pressure on the spring 75 may be increased or decreased, as desired.

Loosely encircling the spring assembly is a tube 80, each end of which is provided with a removable cap 81. Each cap is provided with an opening 82 through which either the collar 76, or the nut 77 may freely pass, as the case may be. The distances between the inner surface of the ends of the caps and the end surfaces of the sleeves are substantially identical.

The tube 80 is provided with a pair of outwardly extending aligned pins 85, welded thereto in the usual manner.

The tube is reinforced, in the region of the pins 85, by a reinforcing collar 86, which is welded to the tube in the usual manner, thus providing a comparatively rigid support for the pins. As heretofore mentioned, the lever 45 is pivoted on a pivot shaft 46, journalled in the frame member 47. A pair of arms 90 are secured to the shaft 46 and engage respective pins 85. Suitable cotter pins pass through the ends of the pins 85 and prevent relative axial movement between the arms 90 and the clutch-operating mechanism.

When the operating lever 45 is shifted from the position shown in Fig. 1 and in full lines in Fig. 2, the spring barrel or tube 80 will be shifted in the opposite direction, for example, to the position shown in broken lines in Fig. 2. One of the collars or caps 81 will engage its coacting sleeve, sliding such sleeve axially of the rod 41, thereby compressing the spring between such sleeve and the other sleeve which is retained in position by the collar 76 or the nut 77, as the case may be. Thus, the operating arm or lever 45 may be quickly moved into either operating position, compressing the spring, which is retained compressed by action of the latch 50, permitting the operator to release the lever 45, regardless of whether or not it has caused engagement of one of the clutch formations. If the clutch does not immediately engage, the spring 75 will thereafter cause such engagement, whereupon the parts of the operating mechanism 42 again assume the relative positions shown in Fig. 2. When it is desired to move the clutch to a neutral position, the lever 45 is operated in the opposite direction, causing the spring again to be compressed and if the load on the clutch is too great to warrant the withdrawal of the clutch without damaging the parts, the spring will permit the shifting of the lever and will, as soon as the pressure of the parts permit, cause the clutch to move to a neutral position.

One of the advantages of my improved construction is the accessibility of the operating parts and the ease with which adjustments may be made. The normal tension of the spring is adjusted by adjusting the position of the nuts 77 and 78. As the caps 81 have a threaded engagement with the tube, they are readily adjusted to compensate for the adjustment of the spring. If desired, the caps may be locked in an adjusted position by locking rings 81a. The replacement of the spring is accomplished by removing the nuts 77 and 78 and the adjacent cap 81, whereupon the sleeve 70 positioned at that end of the tube 80, is removed and the spring replaced. The parts are then restored to their normal position and locked in place.

From the foregoing description it will be seen that I have provided a very simple, compact, efficient yet rugged clutch-operating mechanism, which is economical to manufacture and repair, making it especially adapted for use in connection with rugged machinery, such as concrete mixers, trenchers, ditchers and other similar mechanisms, which are ordinarily operated by comparatively unskilled labor.

I claim:

An operating mechanism for a clutch having a movable clutch member adapted and arranged to be moved into and out of engagement with a second clutch member by a reciprocating movement, said mechanism comprising a rod, a connection between the rod and the movable clutch member, said rod having a pair of spaced shoulders, a pair of bearing sleeves mounted on said rod for sliding movement between said shoulders, a compression spring supported by and disposed between said sleeves, a housing for said spring and sleeves, said housing being slidable relative said shaft, means adjustably carried by said tube adapted and arranged to engage respective sleeves when the tube is moved toward such sleeves, and cause such sleeves to compress said spring, a manual operating arm, a pivotal connection between said arm and said tube, and a latch to retain said arm in an adjusted position against the action of said compression spring.

VINCENT S. PENOTE.